(12) United States Patent
Hiramatsu et al.

(10) Patent No.: US 10,427,513 B2
(45) Date of Patent: Oct. 1, 2019

(54) SUNROOF DEVICE

(71) Applicant: AISIN SEIKI KABUSHIKI KAISHA, Kariya-shi, Aichi-ken (JP)

(72) Inventors: Shinichi Hiramatsu, Chiryu (JP); Shinji Sakai, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/771,976

(22) PCT Filed: Nov. 4, 2016

(86) PCT No.: PCT/JP2016/082863
§ 371 (c)(1),
(2) Date: Apr. 27, 2018

(87) PCT Pub. No.: WO2017/078161
PCT Pub. Date: May 11, 2017

(65) Prior Publication Data
US 2018/0345775 A1    Dec. 6, 2018

(30) Foreign Application Priority Data
Nov. 6, 2015 (JP) ................................. 2015-218963

(51) Int. Cl.
*B60J 10/82* (2016.01)
*B60J 10/84* (2016.01)
(Continued)

(52) U.S. Cl.
CPC ............. *B60J 10/82* (2016.02); *B60J 7/0084* (2013.01); *B60J 7/043* (2013.01); *B60J 10/84* (2016.02); *B60J 10/85* (2016.02)

(58) Field of Classification Search
CPC . B60J 7/043; B60J 7/0084; B60J 10/82; B60J 10/90; B60J 10/85
(Continued)

(56) References Cited

U.S. PATENT DOCUMENTS 5,104,178 A * 4/1992 Bienert .................... B60J 7/022
296/213
5,540,478 A * 7/1996 Schuch ...................... B60J 7/04
224/331
(Continued)

FOREIGN PATENT DOCUMENTS

JP    2005-162099    6/2005
JP    4394282    1/2010

OTHER PUBLICATIONS

Drawings of products regarding: Simplified structure of a sunroof module, available prior to Apr. 27, 2018.

*Primary Examiner* — Dennis H Pedder
(74) *Attorney, Agent, or Firm* — Finnegan, Henderson, Farabow, Garrett & Dunner, LLP

(57) ABSTRACT

A sunroof device includes a sunroof unit, a looped first seal, and a second seal. The sunroof unit supports a panel capable of closing an opening of a roof of a vehicle. The sunroof unit includes a frame provided with two guide rails placed on two edges of the opening in a vehicle widthwise direction and two housings placed on two edges of the opening in a vehicle front-to-rear direction to connect front ends of the two guide rails to each other and rear ends of the two guide rails to each other in the vehicle widthwise direction. The first seal is arranged between an entire periphery of the opening and the frame. The second seal is arranged between opposing surfaces of the guide rails and the housings at portions where the guide rails are coupled to the housings. The second seal is butt against the first seal.

5 Claims, 5 Drawing Sheets

(51) Int. Cl.
*B60J 7/00* (2006.01)
*B60J 7/043* (2006.01)

(58) Field of Classification Search
USPC .......................... 296/216.01–224, 213, 214
See application file for complete search history.

(56) References Cited

U.S. PATENT DOCUMENTS

| | | | | |
|---|---|---|---|---|
| 6,196,625 | B1* | 3/2001 | Nagashima | B60J 7/022 |
| | | | | 296/213 |
| 6,431,644 | B1* | 8/2002 | Nagashima | B60J 7/022 |
| | | | | 296/216.08 |
| 6,454,346 | B1 | 9/2002 | Nabuurs | |
| 6,467,837 | B1* | 10/2002 | Tolinski | B60J 10/82 |
| | | | | 296/213 |
| 6,644,728 | B1* | 11/2003 | Nagashima | B60J 7/022 |
| | | | | 296/213 |
| 7,077,462 | B1* | 7/2006 | De Gaillard | B60J 7/022 |
| | | | | 296/193.04 |
| 8,292,359 | B2* | 10/2012 | Maruyama | B60J 7/022 |
| | | | | 296/216.08 |
| 8,562,070 | B2* | 10/2013 | Weyl | B60J 7/0084 |
| | | | | 296/213 |
| 9,751,387 | B2* | 9/2017 | Nellen | B60J 7/0573 |
| 10,266,040 | B2* | 4/2019 | Tischer | B60J 7/10 |

\* cited by examiner

US 10,427,513 B2

SUNROOF DEVICE

TECHNICAL FIELD

The present invention relates to a sunroof device.

BACKGROUND ART

Patent document 1 describes an example of a sunroof device known in the art. The sunroof device includes a frame-shaped base panel (housing) placed on the periphery of an opening formed in a roof of a vehicle, a sunroof unit including two guide rails and the like coupled to a lower side of the base panel, and a plurality of panels arranged above the base panel to close the opening.

Such a sunroof device typically includes a looped seal continuously arranged between the entire periphery of the opening and the base panel so as to entirely surround the periphery of the opening and a plurality of fastening portions of the base panel. The seal restricts the entrance of water from the outside (water entering outer side of seal) to the inside.

PRIOR ART DOCUMENT

Patent Document

Patent Document 1: Japanese Laid-Open Patent Publication No. 2005-162099

SUMMARY OF THE INVENTION

Problems that are to be Solved by the Invention

Studies are being conducted to omit the base panel and directly place the sunroof unit on the periphery of the opening. More specifically, the sunroof unit that is directly placed on the periphery of the opening includes two guide rails and two housings that connect the front ends of the two guide rails to each other and the rear ends of the two guide rails to each other in a vehicle widthwise direction.

In this case, if the looped seal is merely arranged between the entire periphery of the opening and the sunroof unit in the same manner as the structure of patent document 1, water may enter the inside from the outside through a gap formed where the guide rails are coupled to the housings.

It is an object of the present invention to provide a sunroof device that restricts the entrance of water from the outside to the inside.

Means for Solving the Problem

A sunroof device that solves the above problem includes a sunroof unit, a looped first seal, and a second seal. The sunroof unit is configured to support a panel that is capable of closing an opening of a roof of a vehicle. The sunroof unit includes a frame provided with two guide rails placed on two edges of the opening in a vehicle widthwise direction and two housings placed on two edges of the opening in a vehicle front-to-rear direction to connect front ends of the two guide rails to each other and rear ends of the two guide rails to each other in the vehicle widthwise direction. The first seal is arranged between an entire periphery of the opening and the frame. The second seal is arranged between opposing surfaces of the guide rails and the housings at portions where the guide rails are coupled to the housings. The second seal is butt against the first seal.

EMBODIMENTS OF THE INVENTION

One embodiment of a sunroof device will now be described. In the following description, the upper side and the lower side with respect to a vehicle height-wise direction are simply referred to as "the upper side" and "the lower side," respectively. Further, a vehicle inner side and a vehicle outer side with respect to a vehicle widthwise direction are simply referred to as "the vehicle inner side" and "the vehicle outer side," respectively.

Figure 1A:
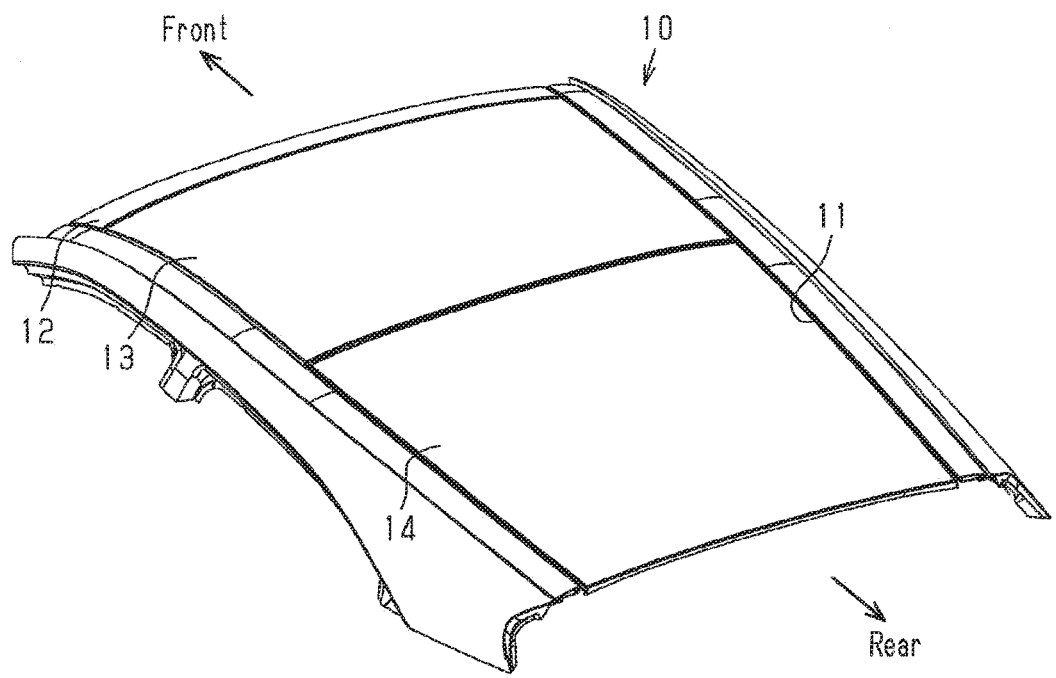
FIG. 1A is a perspective view showing a roof of a vehicle including one embodiment of a sunroof device, in which the sunroof device is in a closed state.
Figure 1B:
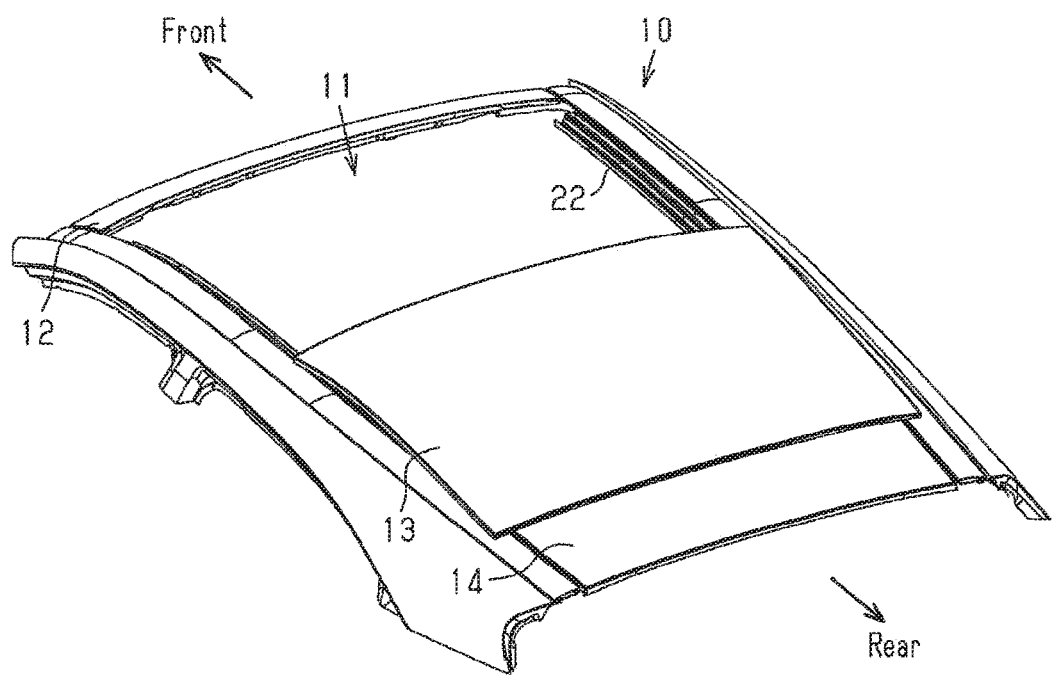
FIG. 1B is a perspective view showing the sunroof device in an open state.

As shown in FIGS. 1A and 1B, a roof 10 of a vehicle such as an automobile includes a substantially rectangular opening 11. Further, a front panel 12, a center panel 13, and a rear panel 14 that are substantially rectangular and formed from, for example, a glass or resin plate, are arranged at the roof 10. The front panel 12 and the rear panel 14 are coupled to the roof 10 so as to constantly close a front portion and a rear portion of the opening 11, respectively. The center panel 13 is coupled to the roof 10 to open and close a middle portion of the opening 11 in a vehicle front-to-rear direction.

Figure 2:
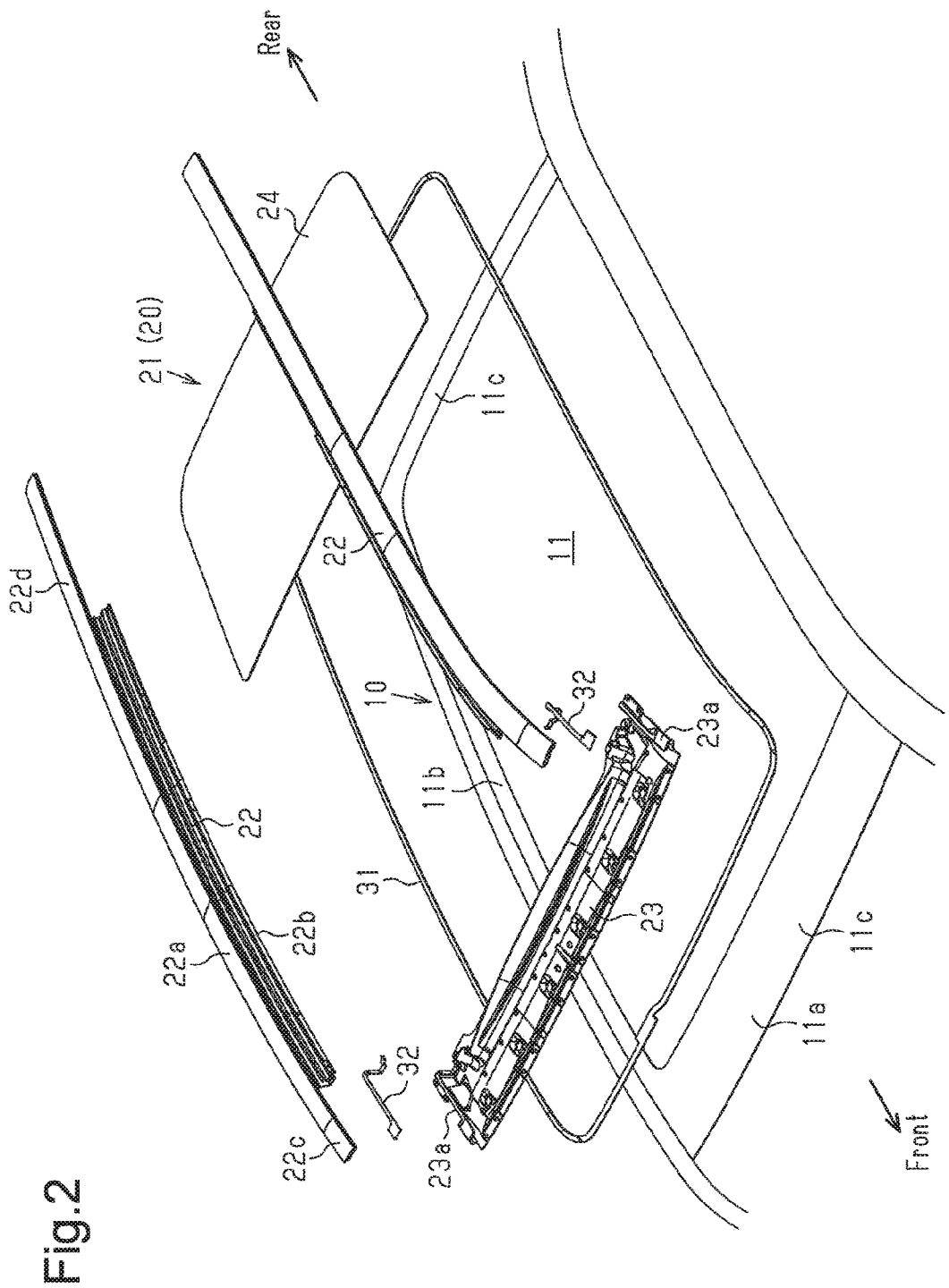
FIG. 2 is an exploded perspective view showing the sunroof device of FIG. 1.

As shown in FIG. 2, a sunroof unit 20 mounted on the roof 10 includes a frame 21 that is shaped to be substantially rectangular in conformance with the substantially rectangular periphery 11a of the opening 11. That is, the frame 21 includes two guides rails 22, which are placed on two edges 11b of the opening 11 in the vehicle widthwise direction, and a front housing 23 and a rear housing 24, which are placed on two edges 11c of the opening 11 in the vehicle front-to-rear direction to connect the front ends of the two guide rails 22 to each other and the rear ends of the two guide rails 22 to each other in the vehicle widthwise direction. The front housing 23 and the rear housing 24 serve as two housings.

Each guide rail 22 is formed from, for example, an extruded material of aluminum alloy. Each guide rail 22 has a cross-sectional shape that is substantially uniform in the longitudinal direction and extends in the vehicle front-to-rear direction. More specifically, the guide rail 22 includes a substantially elongated design portion 22a and a substantially groove-shaped guide 22b extending from the lower end of the vehicle inner side of the design portion 22a toward the vehicle inner side. The design portion 22a has a larger dimension in the front-to-rear direction than the guide 22b. More specifically, the design portion 22a includes a frontward projection 22c that projects frontward beyond the guide 22b and a rearward projection 22d that projects rearward beyond the guide 22b.

The sunroof unit 20 includes two sliding members (not shown) supported to be movable in the vehicle front-to-rear direction along the guides 22b of the two guide rails 22. The center panel 13 extends across the two sliding members and is linked to and supported by the two sliding members. The center panel 13 opens and closes the middle portion of the opening 11 in the vehicle front-to-rear direction as the two sliding members move in the vehicle front-to-rear direction. Further, the sunroof unit 20 supports the front panel 12 and the rear panel 14 at a front portion and a rear portion of the frame 21, respectively.

Figure 3:
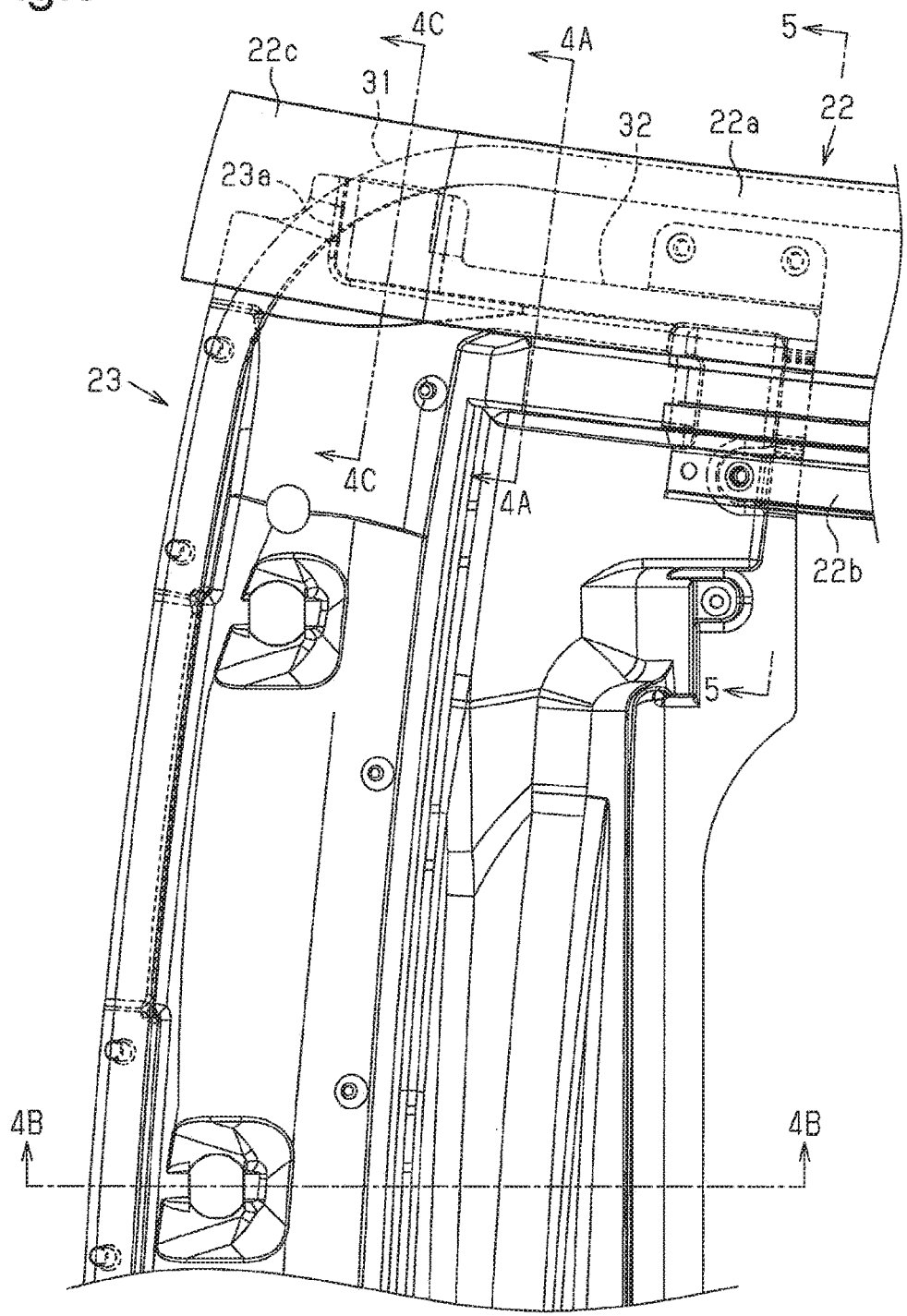
FIG. 3 is a partially enlarged plan view showing the sunroof device of FIG. 1.

As shown in FIGS. 2 and 3, the front housing 23 is formed from, for example, a resin material. The two ends of the front housing 23 in the vehicle widthwise direction each include a seat 23a that receives the front end of the corresponding guide rail 22 (frontward projection 22c and front end of guide 22b) from below. That is, the front ends of the guide rails 22 are placed on the seats 23a of the front housing 23. In the same manner, the rear ends of the guide rails 22 are placed on seats (not shown) of the rear housing 24 having structures similar to the seats 23a.

Figure 4A:
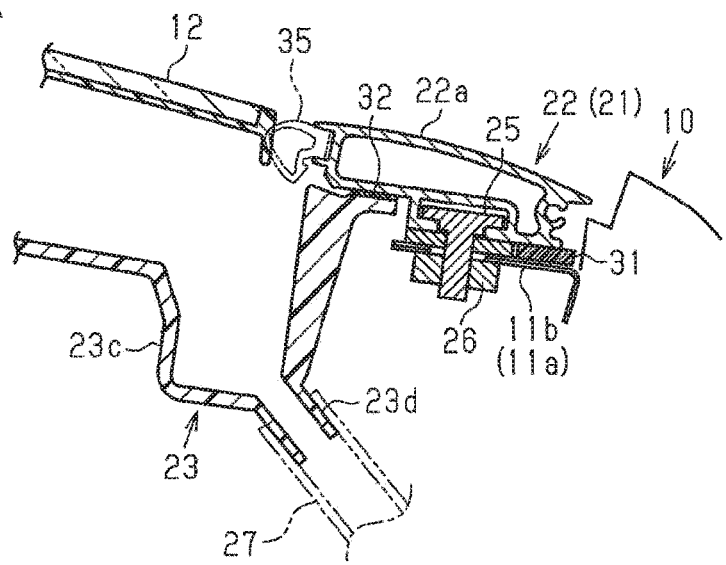
FIG. 4A is a cross-sectional view taken along line 4A-4A in FIG. 3.
Figure 4B:
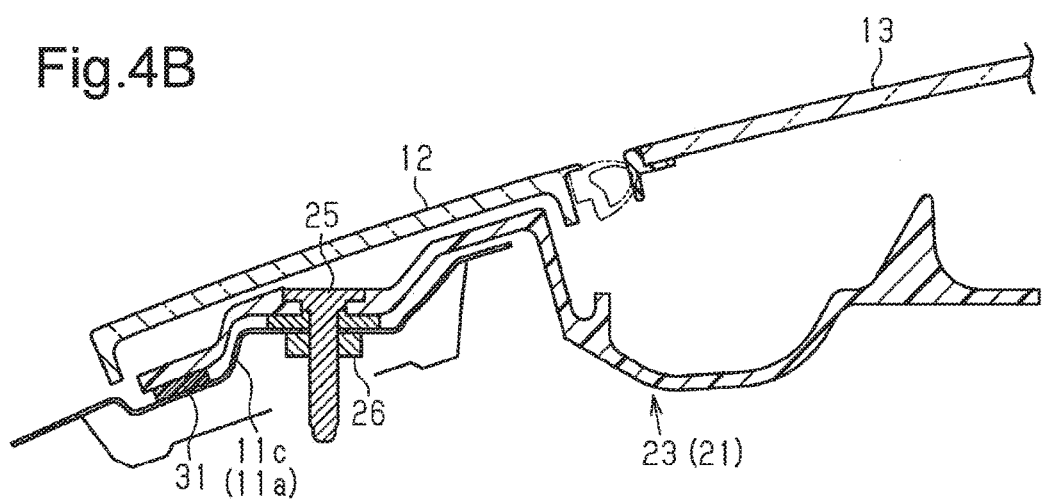
FIG. 4B is a cross-sectional view taken along line 4B-4B in FIG. 3.

The frame 21 is fastened to the entire periphery 11a by a plurality of fasteners spaced apart from one another in the extending direction of the frame 21. More specifically, as shown in FIG. 4A, each guide rail 22 is fastened to the periphery 11a by fitting a head of a bolt 25 into a lower part of the design portion 22a and fastening a nut 26 to a shaft of the bolt 25 that extends through the periphery 11a. Further, as shown in FIG. 4B, the front housing 23 is fastened to the periphery 11a by fitting the head of a bolt 25 into a front edge of the front housing 23 and fastening a nut 26 to the shaft of the bolt 25 that extends through the periphery 11a. In the same manner, the rear housing 24 is fastened to the periphery 11a (not shown).

As shown in FIGS. 2, 4A, and 4B, a looped first seal 31 is arranged between the entire periphery 11a and the frame 21 at the outer side of the fasteners (bolts 25 and the like). More specifically, the frame 21 is placed on the periphery 11a with the first seal 31 located between the frame 21 and the periphery 11a in the vehicle height-wise direction. The first seal 31 continuously extends over the entire periphery 11a. The first seal 31 restricts the entrance of water from the outside (water that enters outer side of first seal 31) to the inside (inner side of first seal 31, namely, passenger compartment) through a gap between the periphery 11a and the frame 21 (two guide rails 22, front housing 23, and rear housing 24).

Figure 4C:
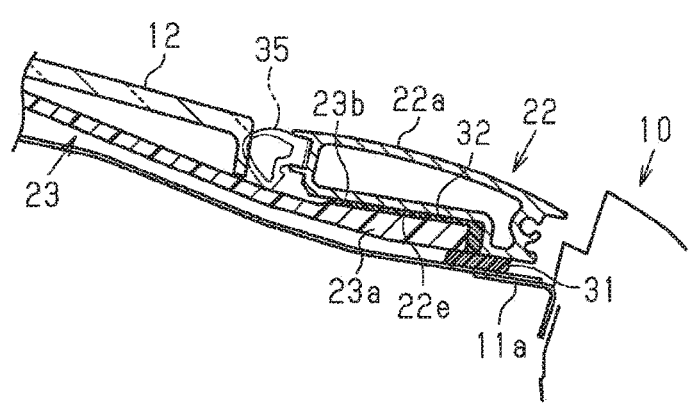
FIG. 4C is a cross-sectional view taken along line 4C-4C in FIG. 3.

Further, as shown in FIGS. 2 and 4C, a second seal 32 is arranged between an upper surface 23b of each seat 23a and a lower surface 22e of the front end of the opposing guide rail 22 (frontward projection 22c and front end of guide 22b) (between opposing surfaces where guide rail and housing are coupled). As also shown in FIG. 3, the second seal 32 is located closer to the center of the opening 11 than the first seal 31. Further, the second seal 32 is butt against the first seal 31 at a distal end that is proximate to the first seal 31. More specifically, in a range in which the upper surface 23b of the seat 23a overlaps the lower surface 22e of the front end of the guide rail 22 in the vehicle height-wise direction, the second seal 32 extends from a position where the second seal 32 butts against the first seal 31 to a position that is closest to the center of the opening 11. In other words, the front housing 23 is overlapped with the guide rail 22 in the vehicle height-wise direction, and the second seal 32 includes a first portion extending between the opposing surfaces (22e, 23b) of the guide rail 22 and the front housing 23 and a second portion that extends downward from the first portion toward the first seal 31 and is butt against the upper surface of the first seal 31. This restricts entrance of water from the outside (for example, water that enters outer side of first seal 31) to the inside (inner side of first seal 31, namely, passenger compartment) through a gap between the upper surface 23b of the seat 23a and the lower surface 22e of the front end of the guide rail 22.

In the same manner, a second seal (not shown) is arranged between an upper surface of each seat of the rear housing 24 and a lower surface of the rear end of the opposing guide rail 22 (rearward projection 22d and rear end of guide 22b).

As shown in FIG. 4A, a weather strip 35 is fitted to the vehicle inner side end of the design portion 22a over substantially the entire length in the vehicle front-to-rear direction. The weather strip 35 has a hollow cross section and is formed from, for example, synthetic rubber such as EPDM rubber or thermoplastic elastomer. The weather strip 35 is in contact in a manner impervious to water with each of the side edges of the front panel 12, the center panel 13, and the rear panel 14 in the vehicle widthwise direction and restricts the entrance of water from the bounding portions with the front panel 12, the center panel 13, and the rear panel 14. The front housing 23 includes a drain 23c recessed downward at a position where the weather strip 35 is located (position of boundary of panels 12 to 14 with guide rail 22) and a substantially tubular drain port 23d located in the lower end of the drain 23c. The drain port 23d is fitted and inserted into a drain pipe 27 in communication with the outside of the vehicle through the drain pipe 27. Accordingly, water, which enters the lower side of the weather strip 35 when the weather strip 35 is deformed by, for example, pressure (water pressure) or the like, is readily discharged out of the vehicle through the drain 23c, the drain port 23d, the drain pipe 27, and the like.

Figure 5:
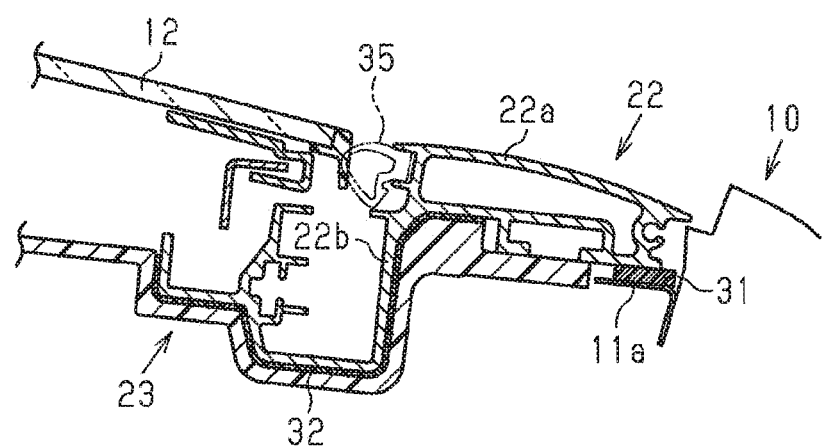
FIG. 5 is a cross-sectional view taken along line 5-5 in FIG. 3.

As shown in FIG. 5, the guide 22b of the guide rail 22 is located downward from the weather strip 35 (downward from boundary of panels 12 to 14 with guide rail 22) and is in communication with the drain 23c at the front end of the guide 22b. Accordingly, water, which enters the lower side of the weather strip 35 when the weather strip 35 is deformed by, for example, pressure (water pressure) or the like, is guided from the guide 22b to the drain 23c and readily discharged out of the vehicle.

As described above in detail, the present embodiment has the following advantages.

(1) In the present embodiment, the first seal 31 restricts the entrance of water from the outside to the inside through a gap between the periphery 11a of the opening 11 and the frame 21 (two guide rails 22, front housing 23, and rear housing 24). Further, the second seal 32, which is located between the opposing surfaces of the guide rail 22 and the front housing 23, is butt against the first seal 31 at the portion where the guide rail 22 and the front housing 23 are coupled. This restricts the entrance of water from the outside to the inside through a gap between the opposing surfaces. In the same manner, the second seal restricts the entrance of water from the outside to the inside between the opposing surfaces of guide rail 22 and the rear housing 24 at the portion where the guide rail 22 and the rear housing 24 are coupled. Accordingly, the first seal 31 and the second seal 32 cooperate to restrict the entrance of water from the outside to the inside over the entire periphery 11a of the opening 11 without any interruptions.

(2) In the present embodiment, water, which enters the lower side of the weather strip 35 from the vehicle inner side of the guide rail 22 when the weather strip 35 is deformed, is readily discharged out of the vehicle through the drain 23*c*, the drain port 23*d*, and the drain pipe 27 without forming pools of water.

(3) The present embodiment is less a base panel (housing) of the prior art. This reduces the mass, manufacturing processes, and cost.

The above embodiment may be modified as described below.

In the above embodiment, the rear housing 24 may be a substantially rectangular loop extending along the periphery of the rear panel 14.

The above embodiment may include a frame that connects the two guide rails to each other in the vehicle widthwise direction at the boundary of the center panel 13 and the rear panel 14 in the vehicle front-to-rear direction. However, it is preferred that a portion where the guide rail 22 is coupled to the frame be located at the inner side of the first seal 31.

In the embodiment, an inner sliding type in which the center panel 13 slides in a tilt-down state when opening and closing the center panel 13 may be employed.

In the embodiment, there may be any number of panels that can close the opening 11. Additionally, the panels may be movable or fixed.

The invention claimed is:

1. A sunroof device comprising:
a sunroof unit configured to support a panel that is capable of closing an opening of a roof of a vehicle, wherein the sunroof unit includes a frame provided with two guide rails placed on two edges of the opening in a vehicle widthwise direction and two housings placed on two edges of the opening in a vehicle front-to-rear direction to connect front ends of the two guide rails to each other and rear ends of the two guide rails to each other in the vehicle widthwise direction;
a looped first seal arranged between an entire periphery of the opening and the frame; and
a second seal arranged between opposing surfaces of the guide rail and at least one of the housings at a portion where the guide rail is coupled to the respective housing, wherein the second seal is butt against the first seal.

2. The sunroof device according to claim 1, wherein
one of the two housings is a front housing that connects the front ends of the two guide rails to each other, and
the second seal is located between the opposing surfaces of the guide rail and the front housing.

3. The sunroof device according to claim 1, wherein
one of the two housings is a rear housing that connects the rear ends of the two guide rails to each other, and
the second seal is located between the opposing surfaces of the guide rail and the rear housing.

4. The sunroof device according to claim 1, wherein
the frame is placed on the periphery of the opening with the first seal located between the frame and the periphery in a vehicle height-wise direction,
at least one of the housings is overlapped with the guide rail in the vehicle height-wise direction, and
the second seal includes a first portion extending between the opposing surfaces of the guide rail and at least one of the housings and a second portion extending downward from the first portion toward the first seal, wherein the second portion is butt against an upper surface of the first seal.

5. The sunroof device according to claim 1, wherein
one of the housings includes a drain,
the guide rail includes a guide that guides the panel, and
the guide is in communication with the drain.

* * * * *